United States Patent [19]

Davis

[11] 4,226,830

[45] Oct. 7, 1980

[54] FLUIDIZED BED REACTOR

[75] Inventor: William L. Davis, Bakersfield, Calif.

[73] Assignee: Hicap Engineering & Development Corporation, Salt Lake City, Utah

[21] Appl. No.: 937,512

[22] Filed: Aug. 28, 1978

[51] Int. Cl.² ............................ B01J 8/18; B01J 8/32; B01J 8/44

[52] U.S. Cl. ..................................... 422/143; 34/10; 34/57 A; 110/245; 110/263; 422/145; 422/147; 422/311; 432/58

[58] Field of Search ............... 422/143, 311, 147, 145; 432/58; 110/245, 263; 34/10, 57 A; 208/164

[56] References Cited

U.S. PATENT DOCUMENTS

| | | | |
|---|---|---|---|
| 2,934,411 | 4/1960 | Purse | 422/311 |
| 3,053,642 | 9/1962 | Huntley et al. | 34/57 A |
| 3,380,911 | 4/1968 | Owen | 208/164 X |
| 3,466,021 | 9/1969 | Van Weert et al. | 422/139 X |
| 3,881,857 | 5/1975 | Hog et al. | 34/57 A |
| 3,883,344 | 5/1975 | Griffith et al. | 422/143 X |
| 3,999,951 | 12/1976 | Bowers et al. | 422/145 |

FOREIGN PATENT DOCUMENTS 723552 12/1965 Canada ..................................... 422/143

Primary Examiner—Michael S. Marcus
Attorney, Agent, or Firm—M. Reid Russell

[57] ABSTRACT

A fluidized bed reactor preferably for high temperature and pressure operations featuring reactor components and constriction plate arrangements therein capable of essentially unlimited size scaleup, the invention avoiding common reactor design and operational problems usually associated with the high temperature and pressure properties of metallic materials of construction such as: thermal expansion, creep, strength and stress-to-rupture. The present invention includes features for uniformly distributing multiple gaseous, liquid, or solid reactants and fuels into a fluidized bed avoiding problems of coking and plugging of distribution pipes and tuyeres due to high temperatures. The present invention is useful for high temperature and pressure combusation, reforming, gasification, reduction, drying and calcination reactions.

16 Claims, 9 Drawing Figures

FLUIDIZED BED REACTOR

BACKGROUND OF THE INVENTION

1. Field of the Invention

The present invention relates to fluidized bed reactors wherein solids are contacted with gases promoting chemical and physical reactions to the solids, and involving heat, mass and momentum transfer, and transport phenomena.

2. History of the Invention

Fluidization refers to a condition whereby fine solid particles that may be inert, catalysts, or reactants, with respect to a fluid or gas passed therethrough, are suspended within a reactor vessel by velocities of the fluid or gas controlled to cause expansion and formation of a dense phase bed of the solids displaying random movement and mixing of particles. Under desired conditions, bed temperatures and compositions rapidly equalize, bubbles form, coalesce, collapse and reform, and the bed assumes a fairly distinct level, having the appearance of a boiling liquid with hydrostatic and hydrodynamic properties.

The popularity and wide industrial choice of fluidized bed reactors derives from their simplicity in design, concept and operation. Although external mechanical means are required for metering gases and solids, internal mechanical moving parts are seldom involved. Thus, when properly designed, reliability and on-line availability are generally excellent. Such reactors present significant advantages in chemical kinetics and heat and mass transfer that are seldom approached by other types of reactors. The ease and preciseness of control over bed temperature and composition is excellent because of near perfect mixing and rapid heat transfer. Many temperature-sensitive materials can be treated in fluidized bed reactors that are excluded from processing in rotary kilns and in fixed and moving bed reactors. Moreover, small particle sizes of fluidized bed solids expose enormous surface areas for gas-solids contact that promote rapid reaction and heat and mass transfer rates in contrast to limited surface areas of large particles and agglomerates as required for the other types of reactors.

Fluidized bed reactors have no particular or inherent design limitations in regard to pressure. Systems operating at many atmospheres are common, and reaction rates are often accelerated by pressure. In contrast, moving bed reactors and rotary kilns are essentially low-pressure systems, generally limited by complex sealing devices to prevent leakage of gases. Fluidized bed reactors also lend themselves to the economic advantages of continuous rather than batch processing, largely deriving from the ease of handling solids as liquid streams. Their only significant disadvantage is that the many advantages provided by rapid solids mixing and bed uniformity also prohibit countercurrency in a single bed. In practice, however, this disadvantage is overcome by multi-bed reactor designs as are common in the industry.

All fluidized bed reactors include a constriction plate to support the bed, separate it from a windbox wherethrough a gas or like combustible fluid is passed, and to distribute the gas from the windbox uniformly into the bed.

A properly designed constriction plate is essential for assuring uniform gas distribution across the reactor's entire area and through the volume of a fluidized bed. When this is accomplished, in sharp contrast to channeling and bypassing of gases as in other reactor types, operational results often improve on scaleup because wall-effects are minimized and short-circuiting of feed solids directly to discharge decreases with size increases. This fortunate result derives on scaleup from obtaining similar or better mixing characteristics, degrees of gas-solids contact, solids and gas retention times, and thus more favorable chemical reaction and mass and heat transfer rates.

In summary, there are essentially no process design constraints that prohibit scaleup of fluidized bed reactors to massive sizes and productive capabilities. However, as discussed hereinbelow, there are practical mechanical design problems associated with the high temperature and pressure properties of metallic materials that limit scaleup of constriction plates, the present invention providing solutions to many of these constraints. Additionally, limitations also exist on the ability to uniformly introduce and distribute gaseous, liquid, and solid reactants and fuels into high temperature fluidized beds, which limitation the present invention also addresses.

3. Prior Art

Process conditions and the economics of plant capacities dictate particular design features of fluidized bed reactors. However, aside from these factors to avoid a multiplicity of small units, reactor diameter and scaleup have heretofore been dictated by constriction plate mechanical designs as affected by limitations imposed by high temperatures, the location of such temperatures within a reactor, and the physical properties of metallic materials of construction. In this context, high temperatures refer to those substantially in excess of 538° C. (1000° F.) at which the strength of carbon steels and even stainless and alloy steels rapidly decrease, thus curtailing their use as structural materials according to heretofore conventional constriction plate design criterion. Location refers specifically to the windbox through which gas or other combustible fluid is distributed into the bed because the temperature therein establishes the temperature the constriction plate will attain during operation. These considerations have resulted in three general types of constriction plates for three levels of windbox temperatures encountered.

Low Windbox Temperatures

This type of constriction plate is included in reactors designed to handle low or moderately preheated windbox gases up to approximately 316° C. (600° F.). The fact that the bed above the constriction plate may be at considerably higher temperatures resulting, for example, from combustion in the bed is not relevant because layers of refractory or insulating brick are usually installed on the upper surface. Thus, constriction plates for such low temperatures presents no serious design and scaleup problems for carbon steel plate materials and carbon steel support beams. An illustration of such constriction plate is shown by Kunii and Levenspiel in a book entitled, "Fluidization Engineering" by John Wiley & Sons, Inc., page 57, (1969).

Moderate Windbox Temperatures

This type of constriction plate is included in reactors for handling windbox gases up to about 538° C. (1000° F.). Stainless and alloy steels are suitable for such constriction plates that may be scaled up to span very large reactor diameters. However, their designs include provisions for flexing up or down to compensate for thermal expansion and creep, which arrangement is also illustrated by the above cited Kunii and Levenspiel reference on page 85.

High Windbox Temperatures

This type of constriction plate is included in reactors that must handle windbox gases substantially above 538° C. (1000° F.). Such high temperatures prohibit the use of metallic materials such as stainless steels using conventional design procedures. Thus, the presently acceptable design is the self-supporting refractory arch or dome constriction plate. Such are constructed of refractory bricks, cut or cast into required shapes, and mortared into place to span the reactor diameter as a series of concentric circles. Orifice holes may be cut or cast into each brick for passage of gases from the windbox, which arrangement is shown in an article by the present inventor and others, Davis, W. L., Jr., et al, entitled "Fluidized Bed Coal Dryer," in the Chemical Engineering Progress, Vol. 58, No. 11 (1962). With such refractory constriction plates alloy steel tuyeres can be mortared into holes in each brick as shown in another article co-authored by the present inventor, Davis, W. L. Jr., et al, entitled "Large Scale Fluidized Bed Drying of Iron Ore Concentrate," AICHE Symposium Series, No. 141, Vol. 70 (1974).

Such refractory dome constriction plates have been successfully used for many years in industrial reactor systems that must employ high windbox temperatures and reactor pressures. However, these installations are circular in the 3.05 to 5.5 meter (10 to 18 ft.) diameter range with a scaleup to about 6.7 meters (22 ft.) in diameter, seemingly their upper limit. Scaleup is limited because of a number of practical problems that become more serious as reactor diameters increase. Major problems include: (1) extreme care, workmanship and quality control are required in producing acceptable dome bricks and during their installation; (2) alloy tuyeres have to be mortared into the bricks and are prone to loosening and popping out which necessitates a lengthy shutdown, and effective in-place cleaning of orifice holes in such tuyeres during shutdown is difficult because they cannot be removed without breaking their mortar joints by sledgehammering; (3) the bricks may crack or spall from thermal expansion and stresses during startup and shutdown, requiring slow preheat and, at shutdown, a lengthy cooling period, with service life dependent upon the number of startups, shutdowns, and windbox temperature variations during operation; (4) the refractory dome is held in place by its expansion against a steel belly band welded around the exterior of the reactor's steel shell, that must be carefully designed in relation to the temperature it will attain and taking into account its own expansion characteristics, with an improperly designed belly band subjecting the dome to cracking during expansion on heatup or it may cause the dome to collapse during contraction on cooling for shutdown; (5) pressure drop limitations imposed across a refractory dome constriction plate, where, generally, that drop should not exceed the unit weight of the dome so as to prevent the dome from lifting and then collapsing, the limit being approximately 6.89 kPa (one psi) limiting the employment of deep beds of dense solids that may exhibit slugging behaviors; (6) as a refractory dome constriction plate is curved to obtain a flat surface especially for the larger reactor diameters, filler bricks need to be used that are mortared to the upper surface of the dome, but are difficult to secure and become locked in by compressive forces during heating and expansion, thereby being very prone to loosening resulting in lengthy shutdown for repairs; and (7) as brick sizes and shapes must be carefully manufactured to meet stringent installation and design requirements to insure reasonable mechanical integrity of the dome, and as orifice holes or tuyeres are formed during that manufacture in each brick, the designer's ability to vary the brick pattern is limited, with a distribution for process reasons thereby severely hampered.

In summary, refractory dome constriction plates are presently successfully used for high temperature windbox conditions and for high internal reactor pressures. However, further appreciable scaleup is doubtful. Examples of inventions utilizing such refractory dome constriction plates are shown in U.S. Pat. Nos. 3,277,582; 3,598,374; 3,661,558; and 3,737,283.

Conventional metallic constriction plates for low or moderate windbox temperatures may be readily adapted to reactors having either circular or rectangular elongate configurations because negligible problems are encountered relating to expansion, elongation, creep or strength. Such a rectangular elongate configuration is shown in U.S. Pat. No. 3,598,375 that discloses a metallic constriction plate design that could possibly be adapted to high temperature windbox conditions but operates at relatively low reactor pressures. Reactors having high internal pressures that might involve many atmospheres positive pressure, must employ a circular configuration and with round or dished top and bottom enclosures as mandated by codes for pressure vessel design, which codes are established for safety reasons by both governmental and industry sponsored regulatory agencies. Thus, the refractory dome constriction plate for circular reactors prior to the present invention provides the only acceptable design for both high windbox temperatures and high reactor internal pressures that would meet design codes. The present invention provides a unique combination of windbox segments supported laterally and at the undersurfaces thereof by plenum solids substituting a number of such windboxes for the single constriction plate of prior reactors and allowing, because of the insulative characteristics of the plenum solids, conventional stainless steel welded techniques to be utilized in fabricating the segments even with high windbox temperatures.

Many applications of fluidized bed reactors require that only a single source of high temperature gas enter the windbox for distribution into the bed. Such applications include the drying of various fine size solids, and the reduction of fine size ores by externally generated reducing gases. Other important applications such as those for combustion, gasification and reforming reactions within the bed require not only that high temperature gases enter the windbox, but also that liquid, gaseous or solid reactants and hydrocarbon fuels be injected and uniformly distributed into a high temperature and pressure fluidized bed. The injection of such fuels is a very serious problem in that the injection means, usually referred to as guns, become hot and the fuels passing therethrough coke and cause plugging. For example, if fuel oil or fine coals are to be injected into a fluidized bed it is conventional to employ guns consisting of double pipes with fuel passing through the center pipe and with a cooling gas passing through the annulus between the two pipes. The guns then enter the bed at many points around the reactor circumference through flanged openings and sealing gaskets and packing glands in the walls. Despite the guns employing cooling gases they still can only be inserted approximately one to two feet into a high temperature fluidized bed because greater insertions result in rapid coking and plugging. Thus, fuels enter the bed only at positions near the reactor walls and none through the center areas. As a result, inefficient reactions occur in localized areas of the bed and a condition develops that is referred to as freeboard burning above the bed. Utilizing the insulative characteristics of the plenum solids and the unique windbox arrangement, the present invention provides for a uniform injection of such hydrocarbon fuels through the bed with minimum coking of injector or gun ends.

A utilization of a similar distribution concept to the present invention is disclosed in the cited U.S. Pat. No. 3,737,283, wherein is taught double pipe guns that do not enter the bed through the reactor sidewalls, but instead pass through the windbox and through a refractory dome constriction plate. This arrangement, however, would still be subject to coking and plugging of the guns because they are, unlike the present invention are, subject to high temperature windbox conditions.

SUMMARY OF THE INVENTION

It is a principle object of the present invention to provide a fluidized bed reactor featuring a constriction plate for uniformly distributing gases into the bed that is independant of support means integral to the reactor regardless of the configurations of said reactor, whether it is circular or rectangular elongate.

Another object is to provide a fluidized bed reactor having a a constriction plate fabricated from suitable metallic materials that is not continuous but exists as a number of sections with plenum solids therebetween and therebelow.

Another object is to provide a fluidized bed reactor with a constriction plate fabricated from suitable metallic materials insulated appropriately such that high temperature windbox conditions that otherwise would affect the physical properties inherent with metallic materials, such as thermal expansion, strength, creep and stress-to-rupture, will not adversely affect the functioning thereof.

Another object is to provide a fluidized bed reactor with a constriction plate that can be employed for high internal reactor pressures.

Still another object is to provide a fluidized bed reactor and constriction plate that are capable of size scaleup substantially beyond sizes presently attainable for high temperature windbox conditions and high internal reactor pressures.

Still another object is to provide a fluidized bed reactor and constriction plate that incorporate an arrangement for injecting supplementary materials such as fuels or reactants in the forms of gases, liquids, and solids uniformly into a high temperature fluidized bed and including insulating those injectors from surrounding high temperatures whereby said fuels or reactants remain cool so as not to dissociate and cause plugging of the injection arrangement.

Still another object is to provide, with a fluidized bed reactor, a constriction plate and windbox formed from conventional metallic materials, that can be operated at high windbox temperatures, that is simple and relatively inexpensive to construct utilizing standard welding techniques.

The present invention in a fluidized bed reactor and constriction plate involves a reactor vessel with a constriction plate arranged therein composed of independant segments all connected appropriately to a gas inlet manifold, the segments uniformly supported by unfluidized plenum solids. The segments are, preferably, separated from each other and from the inside walls of the reactor with plenum solids therebetween, at distances sufficient to allow for expansions, elongation and creep of the metallic materials due to high temperatures. The segments incorporate a plurality of open plenum pipes extending vertically therethrough that pass to a plenum volume beneath the constriction plate segments for flow of unfluidized solids and themselves fill with those solids for providing columnar support and strength to the upper surface of the constriction plate segments, the under surface thereof being supported by unfluidized solids. The filled plenum pipes also provide insulated passages for the installation of nozzles or guns for injecting supplementary fuels and reactants into the fluidized bed. The upper surfaces of the constriction plate segments are equipped with tuyeres for distributing fluidizing gases uniformly across the fluidized bed. The reactor and windboxes are provided with access ports to simplify cleaning during shutdown and, optionally, the reactor vessel can include an arrangement of nozzles for feeding gas into the reactor vessel bottom area for "fluffing" the plenum solids during shutdown operations to prohibit damage to metal members and welds due to unequal rates of shrinkage between metal and plenum solids during cooldown.

Further objects and features of the present invention will become more apparent from the following detailed description taken together with the accompanying drawings.

THE DRAWINGS

FIG. 1, is a cross sectional side elevation view of a schematic fluidized bed reactor of the present invention showing the reactor interior, a fluidized bed therein, a plenum volume filled with unfluidized solids with constriction plate segments shown connected to a gas manifold between the fluidized bed and the plenum volume;

FIG. 2(a), a sectional view taken along the line 2(a)—2(a) in FIG. 1, showing the tops of the constriction plate sections with tuyeres and plenum pipes extending therefrom;

FIG. 2(b), a sectional view taken along the line 2(b)—2(b) in FIG. 1, showing a section through windboxes of the constriction plate sections showing the plenum pipes as extending therethrough;

FIG. 2(c), a sectional view taken along the line 2(c)—2(c) in FIG. 1, showing the plenum volume below the constriction plate sections showing I-beams therein that support the constriction plate sections prior to the plenum volume being filled with unfluidized solids, and a gas manifold arrangement connecting into the constriction plate sections;

FIG. 3, an expanded sectional view taken along the line 3—3 of FIG. 1 showing details of the interior of the fluidized bed reactor, including windboxes therein of the constriction plate segments, tuyeres with dispersal heads extending therefrom and including a non-sifting nozzle thereon, plenum pipes filled with unfluidized solids and the connection arrangement to a gas manifold;

FIG. 4, a sectional view taken within the line 4—4 of FIG. 3, showing a cross section of a tuyere with a non-sifting nozzle thereon;

FIG. 4(a), a top plan view of the non-sifting nozzle of FIG. 4, showing, with broken lines, the distribution ports emerging from the sides thereof;

FIG. 5, a side elevation view like that of FIG. 3 showing the plenum pipes filled with plenum solids with injector guns therein and a distribution line connected to feed to each injector gun supplementary reactants for passage into the fluidized bed and including pipes and nozzles for passing a fluffing gas into the plenum volume during shutdown; and FIG. 6, a plan view taken along the line 6—6 of FIG. 5 similar to that of FIG. 2(a) only showing injection guns with non-sifting heads thereon extending out of the plenum pipes with plenum solids between constriction plate sections shown removed to expose distribution lines arranged in the plenum volume for feeding those injection guns that are shown as broken lines beneath the constriction plate sections.

DETAILED DESCRIPTION

Figure 1:
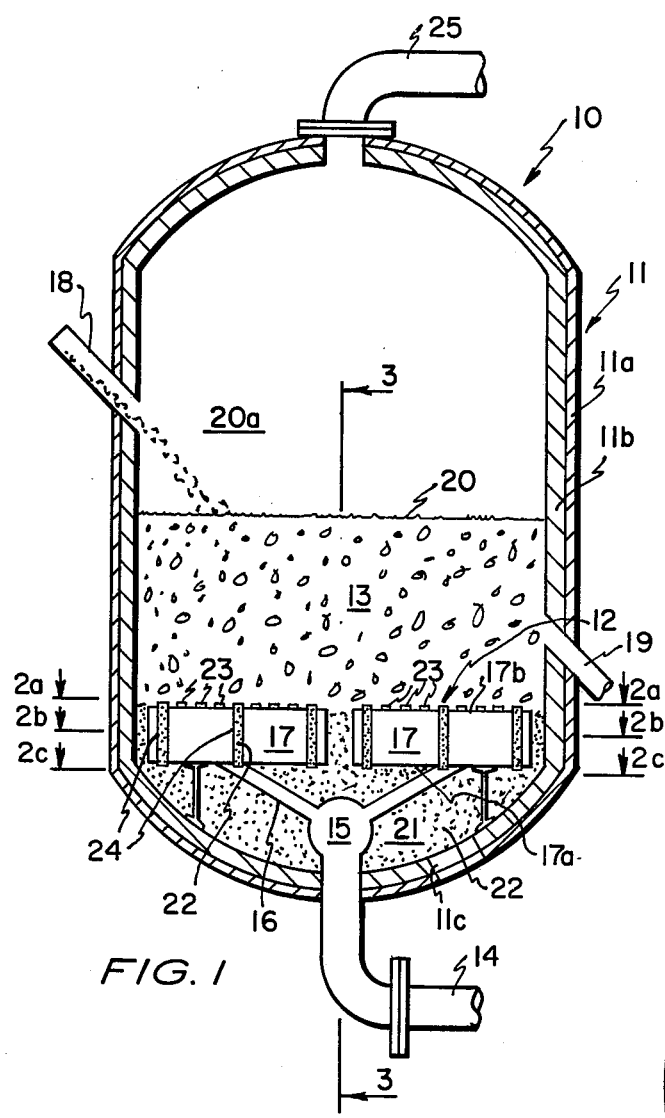

Referring now to the drawings:

FIG. 1 shows schematically a sectional side elevation of a fluidized bed reactor 10, hereinafter referred to as reactor. The reactor 10 is contained within a cylindrical housing 11 that includes an outer shell 11a preferably fabricated from steel and an inner refractory lining 11b and contains a constriction plate 12 arranged thereacross and supporting a bed 13 of fluidized solids. A single fluidizing gas inlet 14 is provided that connects to a manifold 15 within the cylindrical housing 11. Fluidizing gas is passed from the manifold 15 through distributor pipes 16 and the interior, hereinafter referred to as windbox, of constriction plate segments 17, hereinafter referred to as segments, the upper surfaces of segments 17 constitute the constriction plate 12 that supports the bed 13. It should be understood that reactor 10 would be constructed, as are most fluidized bed reactors, to include internal high-temperature refractory and abrasion resistant linings illustrated as refractory lining 11b, and external insulation for the reactor and inlet and exit gas lines, fluidizing blowers or compressors, fluidizing gas preheaters, thermocouple and pressure tap wells, dust collectors, instrumentation, and the like, and could be constructed in stages. Therefore, the representation of FIG. 1 should be taken as a schematic only, and it should be understood that reactor 10 would also include such components.

The fluidized bed 13 of reactor 10 is fed with solids entering through line 18, with product solids withdrawn through line 19 to maintain a bed level 20. As stated above, fluidizing gas enters through line 14, passes into manifold 15 that is located in plenum volume 21, hereinafter referred to as plenum, surrounded, as will be explained hereinbelow, with plenum solids 22. The fluidizing gas from manifold 15 travels through distributor pipes 16 and into the segments 17 wherefrom it is distributed through open tuyeres 23, hereinafter referred to as sifting tuyeres, into fluidized bed 13. The fluidizing gas is either heated prior to passage through inlet pipe 14 as for drying the fluidized bed 13, can be for burning in that bed, or in rare circumstances, could be burned in the segments 17 and then passed into the fluidized bed 13. The segments 17 are preferably constructed by welding of appropriate grades, preferably austenitic types and heavy gauge thicknesses of stainless steel. The choice of stainless or alloy steel depends upon the design temperature within the windbox and gaseous atmosphere (oxidizing or reducing) therein. Thus, fluidizing gas enters through distributor pipes 16 and exits through sifting tuyeres 23 into fluidized bed 13. Gases from bed 13 then pass through a freeboard 20a within the reactor housing 11 where solids are disengaged, falling back to the fluidized bed 13, the off gas passing out through line 25. Segments 17 are supported during assembly by metallic members or beams 26, such as I-beams, or the like, with, when the reactor 10 is in operation, the constriction plate segments 17 and fluidized bed thereabove will be otherwise supported by plenum solids 22.

Figure 2A:
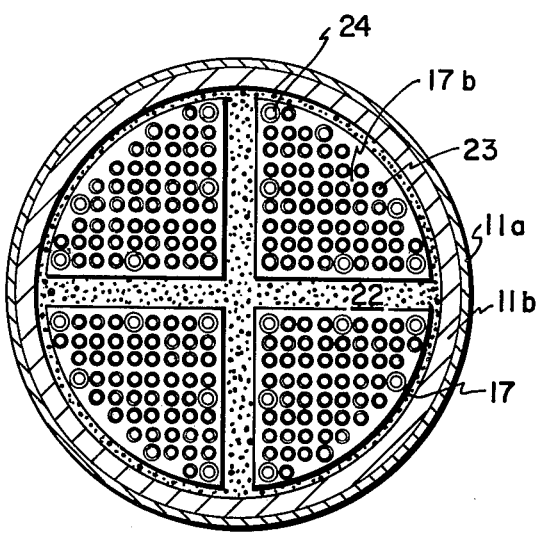
Figure 2B:
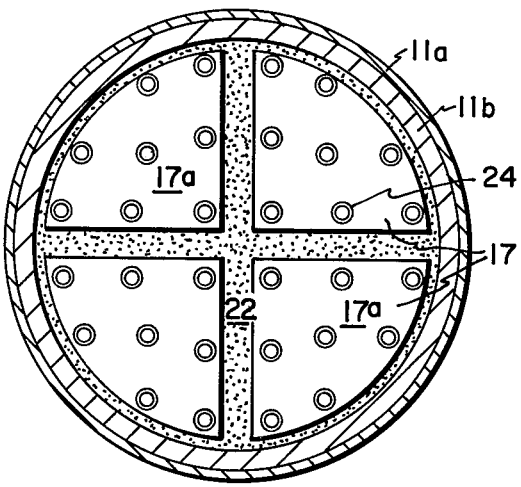
Figure 2C:
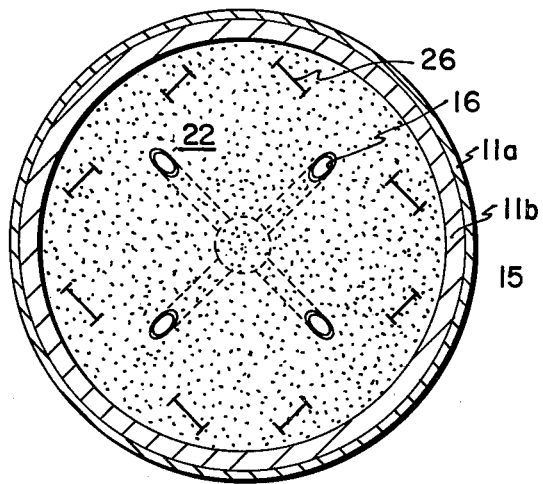
Figure 3:
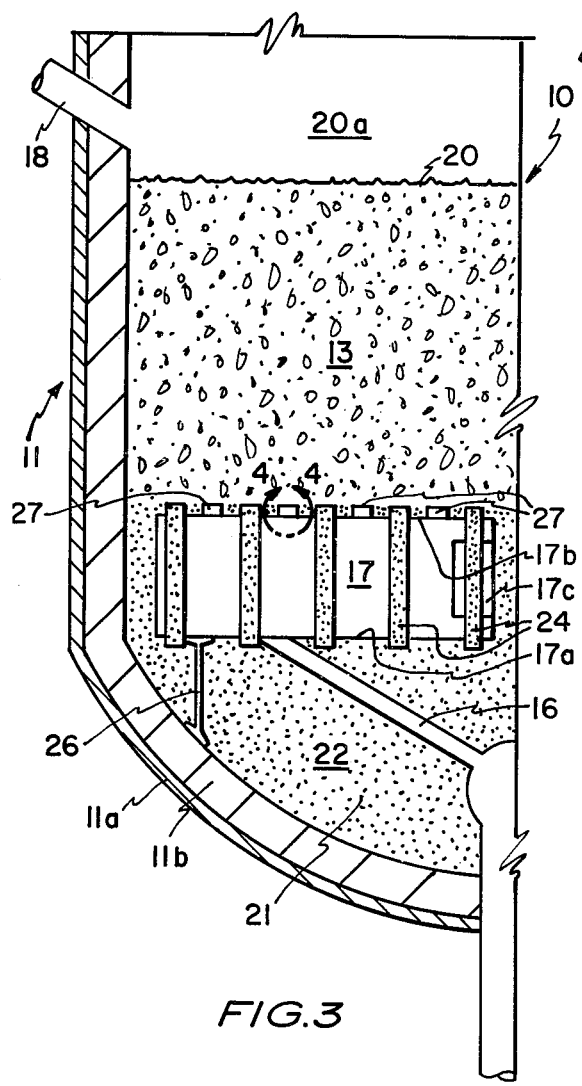

To provide additional reinforcing and support to constriction plate 12 consisting of the surface of segments 17, that must support their own weight and that of the bed above, a plurality of heavy duty stainless steel plenum pipes 24, preferably having schedule numbers 80, 120, or 160, are distributed and welded in, as shown in FIGS. 1 through 3. These plenum pipes are completely open to permit free-flowing plenum solids 22 to freely pour therethrough filling the plenum 21 therebeneath, areas surrounding segments 17, and plenum pipes 24. Thus, before startup plenum solids 22 are charged through line 18 in quantities sufficient to completely fill plenum 21 and plenum volume pipes 24 to the tops of sections 17. Such plenum solids may be the materials to be processed in reactor 10, may be sand, or any other appropriate inert materials that are indicated in FIG. 1 as preferably but are not necessarily different and distinct from those solids in fluidized bed 12. When the plenum is appropriately filled, the segments 17 are supported underneath and on their sides by that static bed of plenum granular solids 22.

Shown in FIGS. 2(a) through 2(c) are sections across and below segments 17, showing the preferred arrangement of sifting tuyeres 23 and plenum pipes 24 and including the arrangement of gas manifold 15 and distributor pipes 16. It should be obvious that the number of segments 17 for any particular reactor 10 may vary depending upon the reactor diameter, size of the reactor's access ports, such an access port 11c shown in FIGS. 1 and 3, and the size of segment components. For a relatively small diameter reactor it might be appropriate to provide only one circular segment supported by unfluidized solids 22 in the plenum 21 that could be connected directly to the gas inlet 14. For larger diameter reactors, an even number of segments, (2, 4, 6 or 8 etc.) is preferred as such arrangement greatly aids in design as the corresponding steel plate sections for welding and fabrication will then be identical.

The four segments 17 shown in FIGS. 1 through 3 are identical in their design and accessory features. The cross section of FIG. 2(c) shows support members or beams 26 that are useful for supporting the segments 17 during their initial installation and during shutdown. In FIG. 2(a) the sifting tuyeres 23 are shown extending out from the upper or bed surface 17b of segments 17 as do plenum pipes 24. The distributor pipes 16 from manifold 15 are shown entering a bottom plate 17a of the segment 17, which bottom plate 17a is as shown in FIG. 2(b). Also in FIG. 2(b) the plenum pipes 24 are shown open to permit complete filling of plenum 21, the arrangement of which plenum pipes through the windbox should be understood to not hamper a free and uniform gas flow to and through sifting tuyeres 23. The plenum pipes 24 filled with plenum solids 22 provide columnar support to the upper or bed surface 17b of segment 17. The plenum solids 22, of course, are also shown filling the spaces between the four segments 17 and between those segments 17 and the inside wall of the refractory lining 11b.

FIG. 3 shows an expanded view of a portion of reactor 10 taken along the line 3—3 of FIG. 1 and includes, additionally to the elements shown in FIG. 1, non-sifting nozzles 27 installed to sifting tuyeres 23 for limiting passage of solids into segments 17 and for distribution of gases therefrom into the bed 13. While not shown an access port can be formed in each segment 17 to aid in initial fabrication and for access during maintenance at shutdown. An access port 11c, is shown in FIG. 1 into the bottom of the plenum 21 to allow draining of the plenum solids 22 at shutdown for maintenance.

While not shown, it should be understood that more than one distribution pipe 16 per each segment 17 might be used, and other configurations for manifolds 15 might be installed to accommodate, for example, a side rather than bottom inlet of gases into plenum 21. Further, the present invention should be understood not to be limited to a certain number of segments 17, nor is it to be limited to any particular fabrication and welding details of segment construction or tuyere installation. Such are to be understood to be within the province of the skilled design engineer and obvious from the present disclosure. Additionally, although the figures illustrate a single-stage fluidized bed reactor, the present invention is not limited to such single-stage reactor and can also be used in multi-stage designs. Also, the height and volume of the segments 17 for a specified reactor diameter is also within the province of the designer. Generally, however, this aspect will be goverened by factors such as minimizing the quantity of construction materials, providing sufficient inside head room for construction and maintenance, providing sufficient windbox or segment volume per installed tuyere according to well-known principles of fluidized bed reactor design, and to avoid excessively fluctuating windbox or interior-segment pressures during operation.

As stated hereinabove, the number of plenum pipes 24 passing through each segment 17 is not critical as they take up a negligible volume within each segment. Thus, the effects on gas velocity and eddy currents within each segment 17 by plenum pipes 24 are negligible with respect to the gas velocities emanating from the sifting tuyeres 23. Further, no design problems of maldistribution of gases from manifold 15 through distribution pipes 16 will be present, provided the cross sectional area of each distribution pipe 16 is relatively large in relation to the total open area of all sifting tuyeres 23. Thus, the tuyere pressure drop will control gas distribution and gas flow rate into each segment 17.

The operational versatility and significant advantages of the present invention, include numerous advantages over prior reactor systems.

There are no design problems with thermal expansion, elongation, or creep of the constriction plate segments and their accessory pipe connections because of the appreciable spaces that can be allowed between segments, and between segments and the inside wall of the reactor. (For example, the expansion of constriction plate segments 40 feet long (12.19 m) in an 80 foot diameter (24.38 m) reactor is 8.448 inches (0.2146 m) for Type 316 stainless steel when heated from room temperature to 871° C. (1600° F.), as determined from Table 5-2, Thermal Expansions for Various AISI Stainless Steel Grades, found in "Engineering Materials Handbook," by Mantell, (McGraw-Hill Book Co., 1958.) No design problems occur in spacing tuyeres that in industrial fluidized bed reactors usually range between 12 and 24 inches (0.3048 and 0.6096 m) apart and therefore distances of this order may be allowed between segments 17 and the inside refractory wall 11b of the reactor 10.

The metallic surfaces of the segments 17 greatly aid in layout and spacing of tuyeres 23 that can be standard screw-in types, and any desirable array can be used in contrast to the constraints on tuyere 23 layout as previously discussed with refractory domes.

There is no need for an external belly band around the reactor shell as required for a refractory dome.

Heat losses are considerably smaller as compared to a conventional hot windbox reactor, as static plenum solids 22 filling the plenum 21 and surrounding the segments 17 are extremely poor heat conductors.

There are no practical restrictions on the pressure drop to ensure uniform gas distribution that can be imposed across the tuyeres 23 installed on the upper surface 17b of the segments 17.

Because of the relatively small pressure differential between the interior of the segments 17 and the surrounding plenum, code welding and rediographing will not be required when assembling the plate sections into the segments 17.

The unfluidized solids 22 filling the plenum 21, plenum pipes 24, and areas between segments 17, said solids 22 supporting the segments 17 may be inert materials such as inexpensive silica sand, or, it is also feasible to allow the feed solids to serve this purpose, provided such solids do not agglomerate and would maintain their free-flowing properties to facilitate draining for maintenance. Also, such plenum solids should be sufficiently different in size, color, or other easily identifiable properties, that they can be distinguished from the bed solids. Therefore, if a leak should develop in a segment 17, the static bed in the surrounding plenum 21 would thereby be disturbed and the plenum solids 22 would appear in and be distinct from the product solids.

The metallic materials of the segments allow great flexibility in the location of thermocouples and pressure taps both inside and outside of the segments and in any area of the reactor's cross sectional area.

Figure 4:
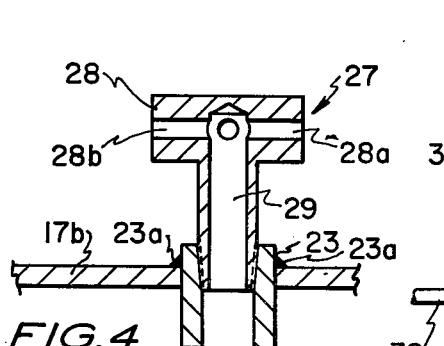
Figure 4A:
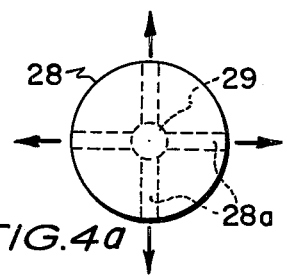

In FIG. 4 is shown a sectional view of a preferred sifting tuyere 23 that is open to pass gas freely therethrough, but will also allow a back passage of bed materials during shutdown. The sifting tuyeres 23 are secured through segment surface 17b, preferably by welding as shown at 23a, and each is preferably appropriately interiorally threaded to receive the non-sifting nozzle 27 turned therein, which non-sifting nozzle will restrict a back flow of bed materials into the windbox at shutdown. As shown in FIG. 4(a), the non-sifting nozzle 27 has a round head with passageways 28a, shown as broken lines, arranged at compass points therearound communicating with an open center bore 29, that connects into sifting tuyere 23.

Figure 5:
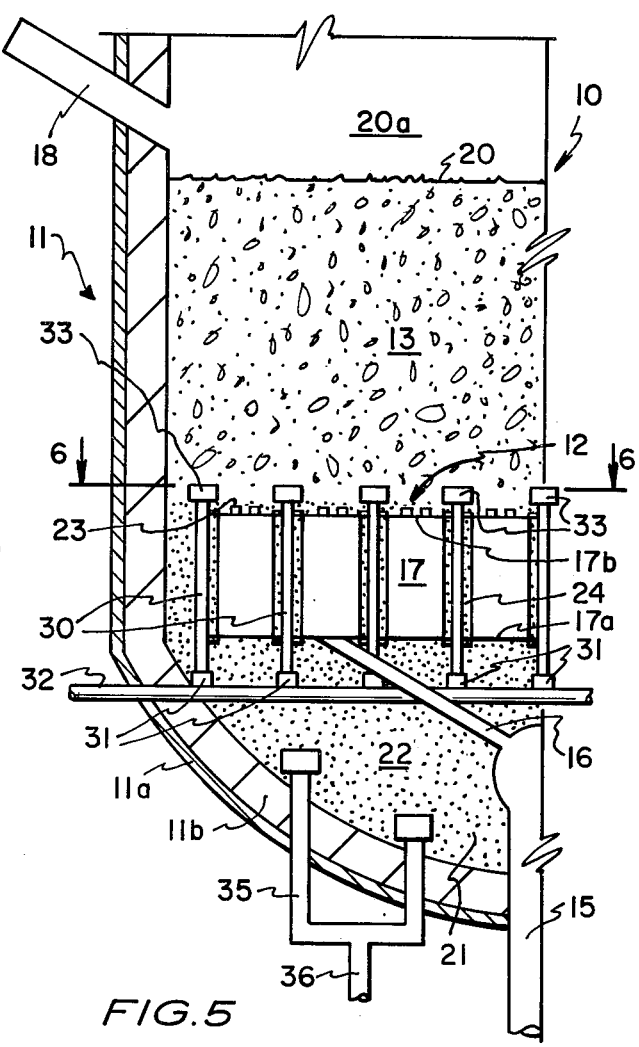

FIG. 5 shows a sectional view similar to that of FIG. 3, and additionally providing an arrangement for continuously injecting one or more supplementary streams of gases, liquid, or solid reactants or fuels into the fluidized bed. Such supplementary streams, of course, being in addition to the described main fluidizing gas passing through tuyeres 23 or 27. In the arrangement of FIG. 5, the reactor housing 11, constriction plate 12 and associated elements, are like those described earlier. The reactor 10 of FIG. 5 additionally includes injection pipes or guns 30 that are installed in the open plenum pipes 24 that extend through segments 17. The injection pipes or guns 30 are connected to bustle pipes 31 that are located within plenum 21 and are surrounded therein and within the plenum pipes 24 with the unfluidized plenum solids 22. The bustle pipes 31 are supplied with reactants or fuel through pipe 32 that passes through the reactor housing 11. Alternatively, each injection pipe or gun 30 could have its own individual feed pipe that passes through the reactor wall for connection to a supply of reactant materials and with suitable metering means, not shown.

In addition to injection pipes or guns 30 arranged in plenum pipes 24, as indicated in FIG. 5, these injection pipes or guns may also be arranged between the individual segments 17, and between the segments 17 and the refractory wall 11b of the reactor 10. These varieties in locations provide for the ability to locate injection pipes or guns 30 uniformly across the cross-sectional area of the reactor 10, with, in all such locations, the injection pipes or guns 30 immersed within the static unfluidized solids 22. Because static unfluidized solids are extremely poor heat conductors, injection pipes or guns 30 are thereby insulated from high temperatures within the windboxes or generated in the fluidized bed 13.

FIG. 5 shows each injection pipe or gun 30 as including a non-sifting nozzle 33 secured on top thereof that should be taken as being like the described non-sifting nozzle 27, but is suitable for injecting the particular supplementary fuel or reactant used. For the injection of liquids such as fuel oil or pneumatically injected coal, a modification to the non-sifting nozzle 33 and/or injection pipe or gun 30 would be in order as these fuels are very prone to coking and plugging if they become hot. Such modifications could involve use of double-pipe injection pipes or guns with cooling gases passing through the annulus thereof, not shown.

Figure 6:
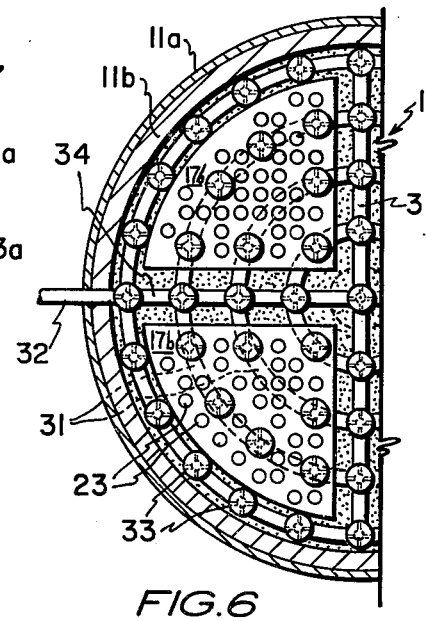

FIG. 6 shows a top plan sectional view taken across the partial constriction plate 12 of FIG. 5, with the non-sifting nozzles 27 not shown on tuyeres 23, the non-sifting nozzles 33 shown extending from injection pipes or guns 30. Therein, the pipe 32 is shown entering the reactor plenum 21 and connecting to bustle pipes 31 located therein, that are shown in broken lines as four concentric circle pipes of progressively smaller diameter toward the center. In addition, as also shown in broken lines in FIG. 6, extension pipes 34 connecting also to pipe 32 preferably pass across and between the four segments 17. Injection pipes or guns 30 are preferably also installed to extend upwardly from these extension pipes 34 to provide additional injection points for more complete coverage of the area above the constriction plate 12. These injection pipes or guns 30 are also surrounded by insulating layers of unfluidized solids 22.

As shown in FIG. 5, optional gas injection guns 35 can be connected through the reactor housing 11 bottom into plenum 21 receiving and passing therethrough a source of gas, preferably inert, from pipe 36. The purpose of such gas injection is for "fluffing" the plenum solids during shutdown to prohibit damage to metal components and welds during cooling due to different rates of contraction between the plenum solids and metal. Absent such "fluffing", the metal elements could be restrained by the packed plenum solids from contracting, stretching and possible breaking the metal or welds.

It is not the intention hereof to restrict applications of my invention by the figures and descriptions therewith, but rather it should be understood that the present disclosure is to illustrate the concepts and principles of the present invention and that changes or alterations hereto obvious to one skilled in the art would still come within the scope of this disclosure. Also, it should be understood that the figures are deliberately not drawn to scale and are exaggerated in some respects for clarity. Therefore, although preferred embodiments of the apparatus of the present invention have been herein disclosed, it should be obvious that the present disclosure is made by way of example only and that variations are possible without departing from the subject matter coming within the scope of the following claims, which claims I regard as my invention.

I claim:
1. A fluidized bed reactor comprising,
    a cylindrical reactor shell;
    means for passing feed solids into the reactor shell and for withdrawing product solids therefrom;
    a windbox structure that consists of a plurality of spaced apart independant sections arranged in the same horizontal plane, and each section includes an upper surface spaced apart from and above a bottom plate for arrangement in said cylindrical reactor shell, said bottom plate spaced from the bottom of said reactor shell thereby forming a reactor chamber above said upper surface and a plenum volume below said bottom plate;
    means for supporting said windbox structures within said cylindrical shell;
    a plurality of plenum pipe means open therethrough for passing of unfluidized feed solids from said reactor chamber into said plenum volume, said plenum pipe means secured at an outer surface thereof to both the upper surface and bottom plate of said windbox structures;
    tuyere array means connected to said windbox structure for passing fluidizing gas therethrough to said reactor chamber through to said reactor chamber and into a bed of feed solids therein;
    conduit means connected to each said windbox structure for supplying fluidizing gas thereto; and
    exhaust means connecting into said cylindrical reactor shell for exhausting gas passed from said fluidized bed.
2. A fluidized bed reactor as recited in claim 1, wherein,
    the cylindrical reactor shell consists of a metal outer skin and contains a refractory lining therein; and
    each windbox structure is formed of metal plates that are welded together.
3. A fluidized bed reactor as recited in claim 1, wherein,
    each windbox structure has a flat surface opposite the reactor chamber that serves as a constriction plate for uniform distribution of fluidizing gases thereacross.
4. A fluidized bed reactor as recited in claim 1, wherein,
    the windbox structures consist of four independant windbox sections, each having a pie section shape, that are spaced apart around a vertical center axis of the cylindrical reactor shell.
5. A fluidized bed reactor as recited in claim 1, wherein the means for supporting said windbox structures consists of, unfluidized solids that fill the plenum volume, surround
said windbox structures and fill the plenum pipes therethrough.

6. A fluidized bed reactor as recited in claim 5, wherein
the unfluidized solids are feed solids fed into the cylindrical reactor shell, that fall between the walls thereof and windbox structure and through the plenum pipes, to fill and pack into the plenum volume and spaces above.

7. A fluidized bed reactor as recited in claim 5, wherein, the unfluidized solids are such as to be easily differentiated
from the fluidized bed solids that feed into the cylindrical reactor shell.

8. A fluidized bed reactor as recited in claim 5, further including, support members installed in the plenum volume of the cylindrical
reactor shell to support the windbox structures when the unfluidized solids are not present therein.

9. A fluidized bed reactor as recited in claim 1, wherein, the tuyere array means are sifting tuyeres that are open between
the windbox structures interior and the fluidized bed.

10. A fluidized bed reactor as recited in claim 1, further including, non-sifting nozzles secured over the open ends of each tuyere to limit back flow of fluidized bed solids into the windbox structure at an interruption of fluidizing gas flow.

11. A fluidized bed reactor as recited in claim 1, further including,
access means into the cylindrical reactor shell, plenum volume and windbox structures for removing solids therefrom during reactor shutdown.

12. A fluidized bed reactor as recited in claim 1, further including,
a gas manifold means arranged within the plenum volume for uniformly distributing fluidizing gases to said conduit means; and
a source of fluidizing gas connected to said gas manifold means.

13. A fluidized bed reactor comprising,
a cylindrical reactor shell;
means for passing feed solids into the reactor shell and for withdrawing product solids therefrom;
a windbox structure that includes an upper surface spaced apart from and above a bottom plate for arrangement in said cylindrical reactor shell, said bottom plate spaced from the bottom of said reactor shell thereby forming a reactor chamber above said upper surface and a plenum volume below said bottom plate;
means for supporting said windbox structure within said cylindrical shell;
a plurality of plenum pipe means open therethrough for passing of unfluidized feed solids from said reactor chamber into said plenum volume, said plenum pipe means secured at an outer surface thereof to both, the upper surface and bottom plate of said windbox structure;
tuyere array means connected to said windbox structure for passing fluidizing gas therethrough to said reactor chamber and into a bed of feed solids therein;
conduit means connected to said windbox structure for supplying fluidizing gas thereto;
exhaust means connecting into said cylindrical reactor shell for exhausting gas passed from said fluidized bed; and
means for fluidizing the unfluidized feed solids in the plenum volume during shutdown consisting of means defining gas jets that extend into the plenum volume; and means defining a demand source of fluidizing gas connected to said gas jets to pass fluidizing gas therethrough.

14. A fluidized bed reactor comprising, a cylindrical reactor shell;
means for passing feed solids into the reactor shell and for withdrawing product solids therefrom;
a windbox structure that includes an upper surface spaced apart from and above a bottom plate for arrangement in said cylindrical reactor shell, said bottom plate spaced from the bottom of said reactor shell thereby forming a reactor chamber above said upper surface and a plenum volume below said bottom plate;
means for supporting said windbox structure within said cylindrical shell including influidized solids
a plurality of plenum pipe means open therethrough for passing of unfluidized feed solids from said reactor chamber into said plenum volume, said plenum pipe means secured on an outer surface thereof to both the upper surface and bottom plate of said windbox structure;
tuyere array means connected to said windbox structure for passing fluidizing gas therethrough to said reactor chamber and into a bed of feed solids therein;
conduit means connected to said windbox structure for supplying fluidizing gas thereto;
exhaust means connecting into said cylindrical reactor shell for exhausting gas passed from said fluidized bed;
injection gun means fitted through said plenum pipe means for passing materials for burning into said fluidized bed
unfluidized solids situated between said injection guns and the respective plenum pipe for insulating said injection gun means from the wind box interior;
bustle pipe means arranged in said plenum volume and connected to said injection gun means for passing materials for conduit means connected to said bustle pipe means for supplying a source of materials to be burned.

15. A fluidized bed reactor as recited in claim 14, further including,
non-sifting tuyere nozzles secured to the tops of the injectors gun means within the fluidized bed.

16. A fluidized bed reactor as recited in claim 14, wherein the bustle pipe means consists of,
a plurality of pipe sets, each set formed into a different diameter of circle from one another and and arranged in the plenum volume, the greatest diameter furthest from the center, diminishing inwardly, the pipe circles connected together by a separate pipe and receiving the materials for burning therethrough.

* * * * *